(12) United States Patent
Onji et al.

(10) Patent No.: US 11,124,096 B2
(45) Date of Patent: Sep. 21, 2021

(54) SEAT

(71) Applicant: DELTA KOGYO CO., LTD., Hiroshima (JP)

(72) Inventors: Atsushi Onji, Hiroshima (JP); Yuya Watase, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 0 days.

(21) Appl. No.: 16/889,679

(22) Filed: Jun. 1, 2020

(65) Prior Publication Data

US 2020/0391624 A1    Dec. 17, 2020

(30) Foreign Application Priority Data

Jun. 14, 2019 (JP) .............................. JP2019-111392

(51) Int. Cl.
*B60N 2/28* (2006.01)
*B60N 2/58* (2006.01)
*B60N 2/60* (2006.01)

(52) U.S. Cl.
CPC ............. *B60N 2/28* (2013.01); *B60N 2/2893* (2013.01); *B60N 2/58* (2013.01); *B60N 2/6009* (2013.01)

(58) Field of Classification Search
CPC ........ B60N 2/28; B60N 2/2887; B60N 2/289; B60N 2/2893; B60N 2/58; B60N 2/6009
See application file for complete search history.

(56) References Cited

U.S. PATENT DOCUMENTS

| | | | | |
|---|---|---|---|---|
| 9,656,577 | B2 * | 5/2017 | Sekino | B60N 2/2893 |
| 9,738,183 | B2 * | 8/2017 | Szlag | B60N 2/58 |
| 2016/0200224 | A1 * | 7/2016 | Fujikake | B60N 2/289 |
| | | | | 297/452.38 |
| 2017/0355286 | A1 | 12/2017 | Terada et al. | |
| 2018/0361890 | A1 * | 12/2018 | Ishizaka | B60N 2/2893 |

FOREIGN PATENT DOCUMENTS

JP    2017-218125 A    12/2017

* cited by examiner

*Primary Examiner* — David R Dunn
*Assistant Examiner* — Tania Abraham
(74) *Attorney, Agent, or Firm* — Studebaker & Brackett PC (57) ABSTRACT

Provided is a seat reducible risk of releasing a connection between a bezel and a cover. The seat allows attaching of a child safety seat, and includes a bezel and a cover covering the bezel. The bezel and the cover respectively include a pair of bezel-side overlap portions and a cover-side overlap portion that overlap with each other in an intersecting direction intersecting an attaching-and-detaching-direction of a bezel body and a cover body. One of the bezel-side overlap portions and the cover-side overlap portion are formed with a through-hole, and the other of the bezel-side overlap portions is formed with a female-threaded-hole. Then, in a state where the pair of bezel-side overlap portions and the cover-side overlap portion overlap each other in the intersecting direction, a fastening member is inserted into the through-hole and a male-threaded portion is screwed into the female-threaded-hole to connect between the bezel and the cover.

11 Claims, 8 Drawing Sheets

SEAT

TECHNICAL FIELD

The present invention relates to a seat allowing attaching of a child safety seat.

BACKGROUND ART

In recent years, as a seat allowing attaching of a child safety seat, a seat having a structure allowing attaching of a child safety seat with a fixing system of an international standard called ISOFIX has been used.

As described in Japanese Unexamined Patent Publication No. 2017-218125, such a seat has a structure connectable to a connector provided at the rear of a child safety seat with an ISOFIX fixing system.

Specifically, the seat described in Japanese Unexamined Patent Publication No. 2017-218125 has a structure in which a surface of a pad is covered with a covering material, and is provided with a connector attaching part connectable to a connector of a child safety seat. The connector attaching part has a structure in which a metal bar connectable to the connector is disposed inside an opening formed in the pad and the covering material.

The connector attaching part includes a bezel formed of a frame that is fastened to a bracket with a screw around a peripheral portion of the opening formed in the pad and the covering material.

The bracket is disposed above the opening with being interposed between the pad and the covering material, and is fixed to the metal bar inside the pad. The bracket is formed with a screw hole into which the above screw is screwed.

The bezel is overlapped on the bracket from above with the covering material being interposed between the bezel and the bracket, and is fastened to the bracket with a screw. This allows the bezel to be fixed to the bracket with the covering material being interposed between the bezel and the bracket.

As described above, the seat disclosed in Japanese Unexamined Patent Publication No. 2017-218125 includes the bezel that is fixed to the bracket with the screw from a vertical direction that is an attaching-and-detaching-direction of the bezel and the bracket.

Thus, when an external force is applied to the bezel in the attaching-and-detaching-direction (i.e., the vertical direction), for example, when a seated occupant or the like riding the seat to take baggage behind the seat pushes down the covering material around the bezel due to a weight of the seated occupant or the like, the screw hole formed in the bracket may be damaged. As a result, the connection between the bezel and the bracket may be released to cause the bezel to fall off.

It is an object of the present invention to provide a seat capable of reducing a risk of releasing a connection between a bezel and a cover.

SUMMARY OF INVENTION

To solve the problem described above, a seat of the present invention allows attaching of a child safety seat, and includes: a covering material formed with a covering material opening allowing insertion of a connector of the child safety seat; a bezel including a bezel body that is disposed inside the covering material, and that has a shape capable of receiving the connector, and a front-side contact portion in contact with a peripheral portion of the covering material opening on a front side of the covering material; a cover including a cover body covering at least a part of an outer peripheral surface of the bezel body, the cover body being detachable from the bezel body in a predetermined attaching-and-detaching-direction, and a back-side contact portion in contact with a peripheral portion of the covering material opening on a back side of the covering material; and a fastening member with a male-threaded portion. The bezel and the cover include a bezel-side overlap portion and a cover-side overlap portion, respectively, overlapping each other in a predetermined intersecting direction intersecting the predetermined attaching-and-detaching-direction of the bezel body and the cover body. The bezel-side overlap portion and the cover-side overlap portion are each formed with a hole allowing insertion of the fastening member in the predetermined intersecting direction. The hole of at least one of the bezel-side overlap portion and the cover-side overlap portion is a female-threaded-hole allowing fastening of the male-threaded portion. The fastening member is inserted into the hole and the male-threaded portion is screwed into the female-threaded-hole to connect the bezel and the cover to each other with the bezel-side overlap portion and the cover-side overlap portion overlapping each other in the intersecting direction.

DESCRIPTION OF EMBODIMENTS

Hereinafter, a preferred embodiment of the present invention will be described in detail with reference to the accompanying drawings.

Figure 1:
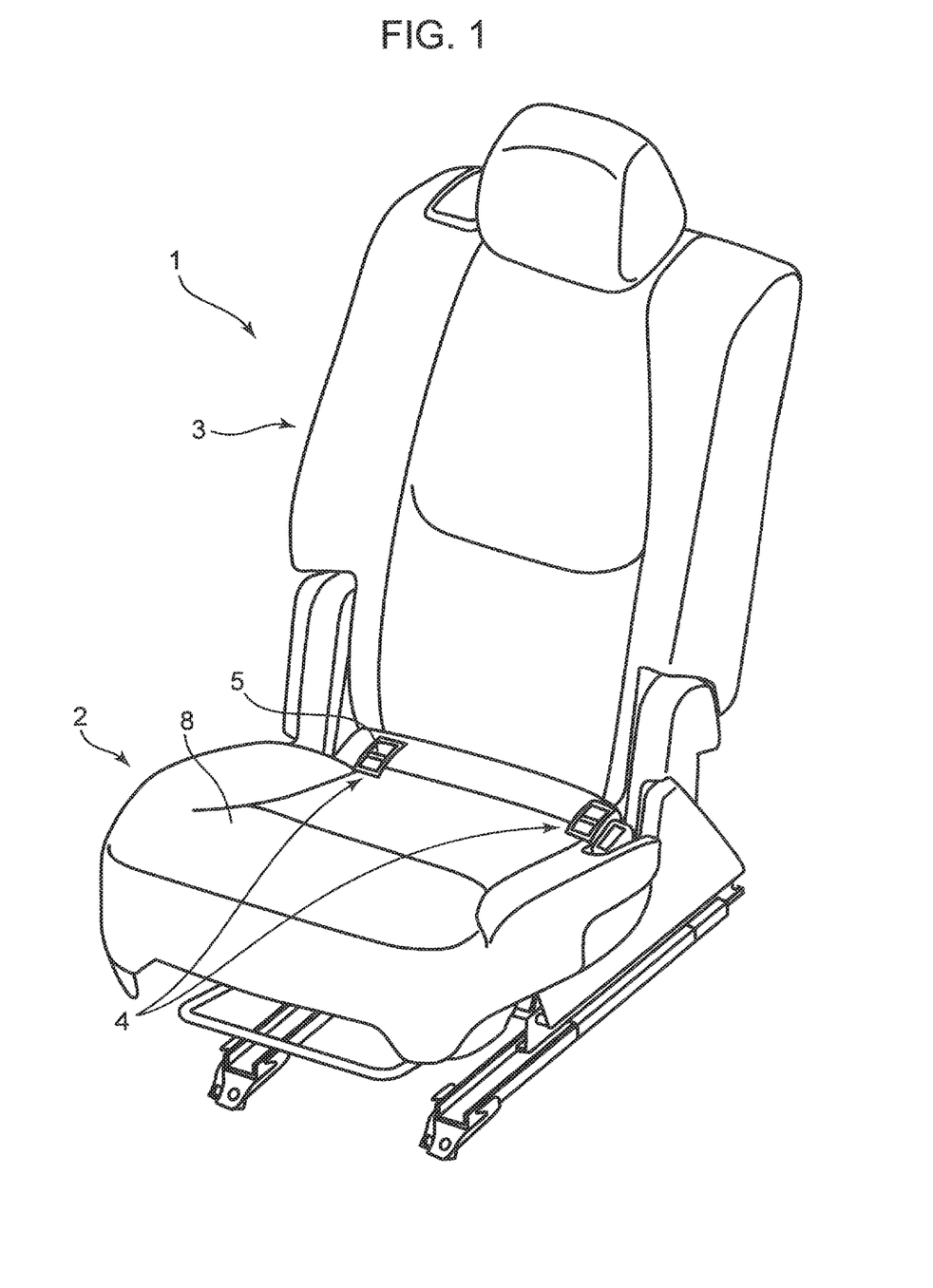
FIG. 1 is a perspective view illustrating a general configuration of a seat according to an embodiment of the present invention.
Figure 2:
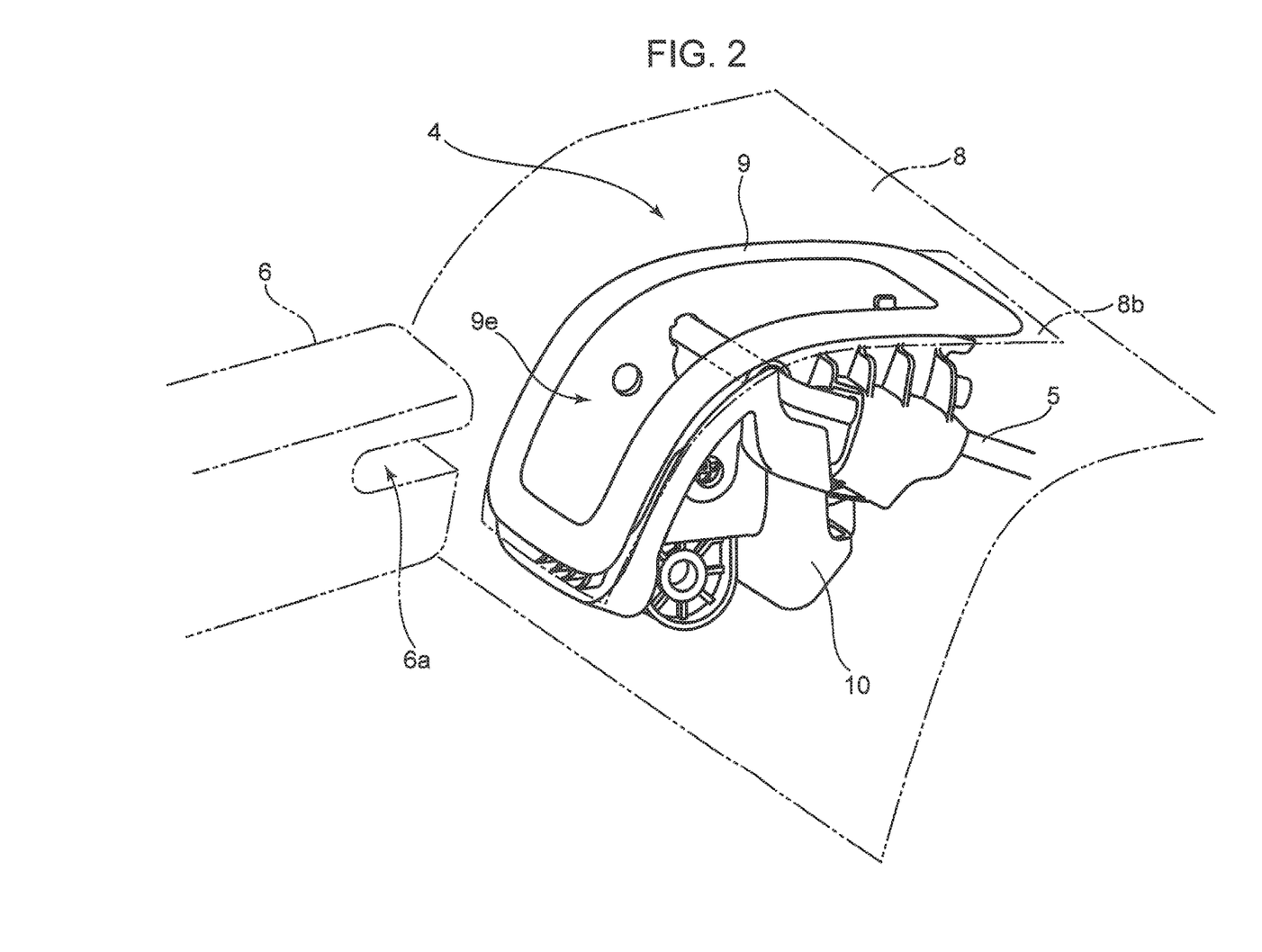
FIG. 2 is an enlarged perspective view of a connector attaching part of FIG. 1 and a peripheral portion thereof.
Figure 3:
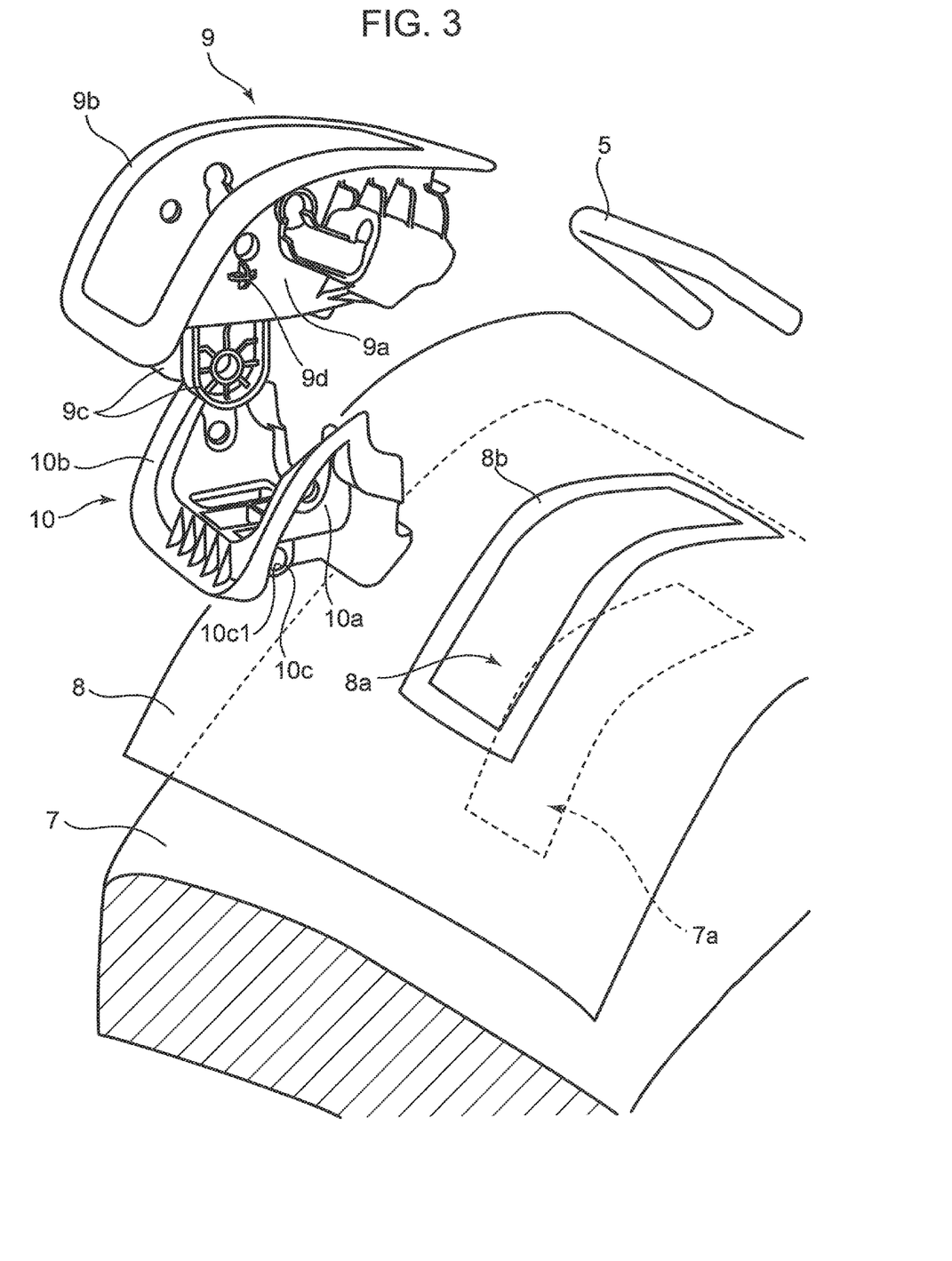
FIG. 3 is an exploded perspective view illustrating a configuration of each part of the connector attaching part of FIG. 2.

FIGS. 1 to 3 each illustrate a seat 1 that is used as a passenger seat or a rear seat of an automobile, and that has a structure allowing attaching of a child safety seat of an ISOFIX fixing system. That is, the seat 1 has a seat structure having a seat cushion 2 serving as a seat bottom and a seat back 3 serving as a backrest, and is provided on its seat cushion 2 side with a pad 7, a covering material 8 in a sheet-like shape or a bag-like shape, covering a surface of the pad 7, and a pair of connector attaching parts 4 each connectable to a connector 6 of the child safety seat. In the present embodiment, the connector attaching part 4 is provided in a raised portion at a rear end of the seat cushion (an end on a seat back 3 side).

The connector attaching part 4 has a structure including: a pad opening 7a in a rectangular shape formed in the pad 7; a covering material opening 8a in a rectangular shape formed at a position in the covering material 8, the position allowing the covering material opening 8a to communicate with the pad opening 7a; and a metal bar 5 in a U-shape turned sideways serving as an engagement portion engageable with the connector 6, being provided inside the pad opening 7a. The pad opening 7a and the covering material opening 8a each have a size allowing insertion of the connector 6. The metal bar 5 is disposed inside the pad opening 7a with its central portion extending in a direction across the pad opening 7a. The metal bar 5 is connected to a metal frame (not illustrated) that supports the pad 7 of the seat 1.

In the present embodiment, the covering material opening 8a in a rectangular shape has a peripheral portion 8b (see FIG. 3) reinforced by a thin resin having flexibility (such as polypropylene). As a result, for example, even when the covering material 8 around the connector attaching part 4 is pressed downward by a seated occupant's hand or the like to cause the covering material 8 to be pulled in a direction of detaching the covering material 8 from the connector attaching part 4 (i.e., outward of the connector attaching part 4), increase in rigidity of the peripheral portion 8b due to the thin resin enables preventing the covering material 8 from slipping through between a bezel 9 and a cover 10 described later, constituting the connector attaching part 4, i.e., preventing the covering material 8 from detaching from the connector attaching part 4.

The thin resin of the peripheral portion 8b has an edge that comes into contact with a side wall of a back-side contact portion 10b of the cover 10, so that the covering material 8 can be prevented from being detached form the connector attaching part 4. The peripheral portion 8b may be reinforced by a thin cloth, leather, a metal plate, or the like instead of a thin resin, but may not be reinforced when the covering material 8 is made of a material with sufficient strength. Details of the above-described bezel 9 and cover 10 will be described later.

As illustrated in FIGS. 2 to 5, the connector attaching part 4 further includes the bezel 9 disposed inside the pad opening 7a inside the covering material 8 to receive the connector 6, the cover 10 covering the outside of the bezel 9, and a screw 12 made of metal serving as a fastening member having a male-threaded portion 12a. The bezel 9 and the cover 10 are disposed inside the pad opening 7a while being connected to each other with the screw 12. Another member other than the screw 12 (e.g., a bolt) may be used as the fastening member.

As illustrated in FIGS. 4 to 8, the bezel 9 includes a bezel body 9a having a shape capable of receiving the connector 6, a front-side contact portion 9b in contact with the peripheral portion 8b of the covering material opening 8a on a front side of the covering material 8, and at least one bezel-side protrusion 9c (a pair of bezel-side protrusions 9c in the present embodiment as a bezel-side overlap portion). The bezel body 9a, the front-side contact portion 9b, and the pair of bezel-side protrusions 9c are integrally molded with resin (e.g., hard synthetic resin such as ABS) to constitute the bezel 9 of the present embodiment.

Figure 5:
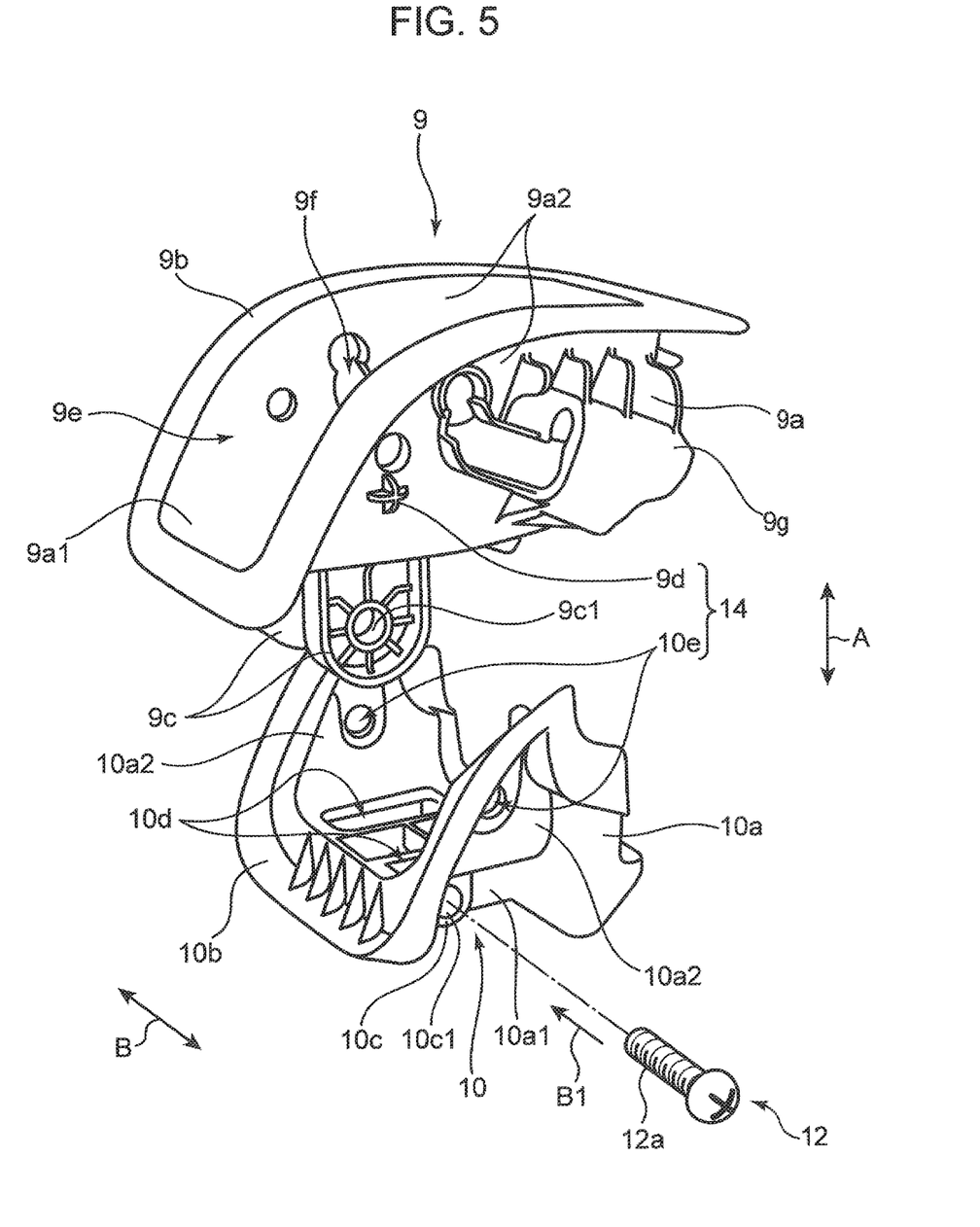
FIG. 5 is a perspective view illustrating a state where the bezel and the cover of FIG. 4 are separated.
Figure 6:
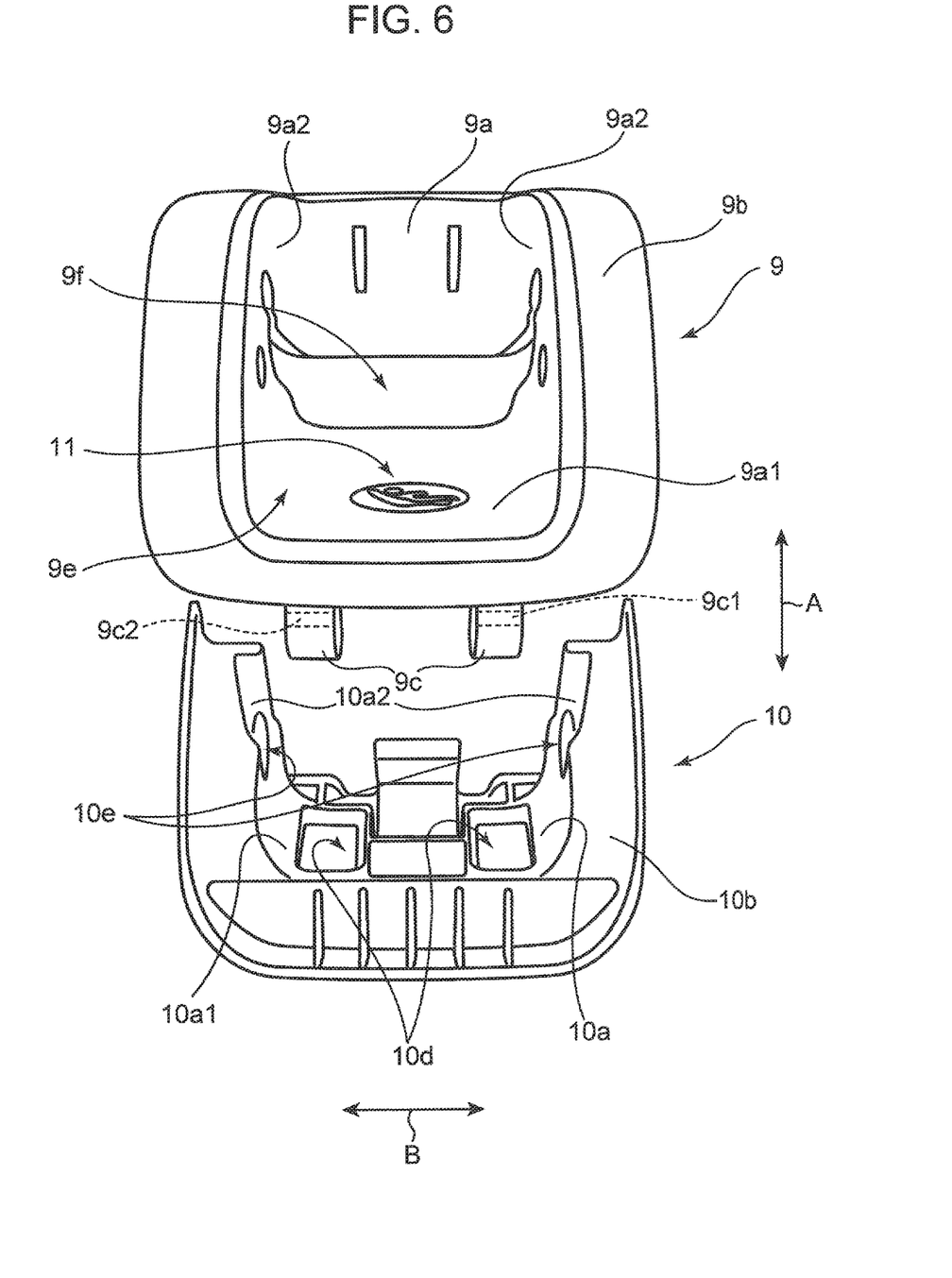
FIG. 6 is a front view illustrating a state where the bezel and the cover of FIG. 4 are separated.

As illustrated in FIGS. 5 and 6, the bezel body 9a includes a bottom portion 9a1 and a pair of side portions 9a2 rising from both sides of the bottom portion 9a1. The bottom portion 9a1 and the pair of side portions 9a2 form a connector insertion space 9e capable of receiving the connector 6. The bottom portion 9a1 and the pair of side portions 9a2 are formed with a consecutive slit 9f from the bottom portion 9a1 to the pair of side portions 9a2. The metal bar 5 has a central portion (see FIGS. 2 and 3) that can be inserted into the slit 9f to protrude into the connector insertion space 9e. Inserting the connector 6 (see FIG. 2) into the connector insertion space 9e enables connection between a connection portion 6a of the connector 6 and the metal bar 5.

In the present embodiment, the pair of side portions 9a2 of the bezel body 9a is each provided outside with an engagement portion 9g engageable with one of arm portions on both sides of the metal bar 5.

In the present embodiment, as illustrated in FIG. 6, a surface visible from the outside in an inner peripheral surface of the bezel body 9a, i.e., an upper surface of the bottom portion 9a1 of the bezel body 9a, is formed with an ISOFIX mark 11 indicating that the seat 1 conforms to the ISOFIX standard, for example, as a display portion for displaying information with regard to a child safety seat. The ISOFIX mark 11 is formed by forming asperities on a surface of the bottom portion 9a1 during resin molding of the bezel 9.

In the present embodiment, the ISOFIX mark 11 is formed on the upper surface of the bottom portion 9a1 of the bezel body 9a at the center in a width direction of the bezel 9, identical to an orthogonal direction B in FIG. 6, described later.

The front-side contact portion 9b has a shape capable of coming into contact with the peripheral portion 8b of the covering material opening 8a on the front side of the covering material 8. In the present embodiment, the front-side contact portion 9b has a rectangular shape similar to that of the peripheral portion 8b, and can come into contact with a whole circumference of a front surface of the peripheral portion 8b. The front-side contact portion 9b is formed in a direction extending outward from the connector insertion space 9e along edges of the bottom portion 9a1 and both the side portions 9a2 of the bezel body 9a.

The pair of bezel-side protrusions 9c protrudes downward from an outer peripheral surface of the bottom portion 9a1 of the bezel body 9a. In the present embodiment, the pair of bezel-side protrusions 9c is disposed at respective positions other than a back side of the ISOFIX mark 11 on the outer peripheral surface of the bottom portion 9a1 of the bezel body 9a. Specifically, the pair of bezel-side protrusions 9c is disposed at respective positions separated from each other on both sides of the bezel 9 in the width direction, identical to the orthogonal direction B in FIG. 6, across a region on the outer peripheral surface of the bottom portion 9a1 of the bezel body 9a, the region being the back side of the ISOFIX mark 11.

As illustrated in FIGS. 4 to 8, one of the pair of bezel-side protrusions 9c is for wed with a through-hole 9c1 allowing insertion of the screw 12, and the other thereof is formed with a female-threaded-hole 9c2 allowing screwing of the male-threaded portion 12a of the screw 12.

As illustrated in FIGS. 4 to 8, the cover 10 is configured to cover at least a part of an outer peripheral surface of the bezel body 9a, and includes a cover body 10a detachable from the bezel body 9a in a predetermined attaching-and-detaching-direction A, i.e., in the vertical direction illustrated in FIGS. 5 and 6, a back-side contact portion 10b in contact with the peripheral portion 8b of the covering material opening 8a on a back side of the covering material 8, and one cover-side protrusion 10c (a cover-side overlap portion). The cover body 10a, the back-side contact portion 10b, and the one cover-side protrusion 10c are integrally molded with resin (e.g., hard synthetic resin such as ABS) to constitute the cover 10 of the present embodiment.

As illustrated in FIGS. 5 and 6, the cover body 10a includes a bottom portion 10a1 and a pair of side portions 10a2 rising from both sides of the bottom portion 10a1. The outer peripheral surface of the bezel body 9a can be covered with the bottom portion 10a1 and the pair of side portions 10a2.

The bottom portion 10a1 of the cover body 10a is formed with a pair of openings 10d allowing insertion of the corresponding pair of bezel-side protrusions 9c.

The one cover-side protrusion 10c protrudes downward from an outer peripheral surface of the bottom portion 10a1 in a portion between the pair of openings 10d of the bottom portion 10a1. The one cover-side protrusion 10c is formed with a through-hole 10c1 at a position communicating with the through-hole 9c1 and the female-threaded-hole 9c2 of the corresponding pair of bezel-side protrusions 9c.

In the present embodiment, the pair of bezel-side protrusions 9c serving as the bezel-side overlap portions and the cover-side protrusion 10c serving as the cover-side overlap portion are respectively formed with the through-hole 9c1, the female-threaded-hole 9c2, and the through-hole 10c1 in the orthogonal direction B, i.e., an intersecting direction orthogonal to the attaching-and-detaching-direction A, as holes allowing insertion of the screw 12. The female-threaded-hole 9c2 allowing fastening of the male-threaded-portion 12a is formed in the corresponding one of the pair of bezel-side protrusions 9c.

That is, the seat 1 of the present embodiment has a structure in which the bezel 9 and the cover 10 respectively include the pair of bezel-side protrusions 9c and the cover-side protrusion 10c that overlap each other in the orthogonal direction B in the present embodiment as a predetermined intersecting direction intersecting the attaching-and-detaching-direction A of the bezel body 9a and the cover body 10a.

One of the pair of bezel-side protrusions 9c and the cover-side protrusion 10c are respectively formed with the through-holes 9c1 and 10c1 that are formed in the orthogonal direction B and that allow insertion of the screw 12.

The other of the bezel-side protrusions 9c is fon ied with the female-threaded-hole 9c2 that is formed in the orthogonal direction B, communicating with the through-holes 9c1 and 10c1, and that allows fastening of the male-threaded portion 12a.

Figure 7:
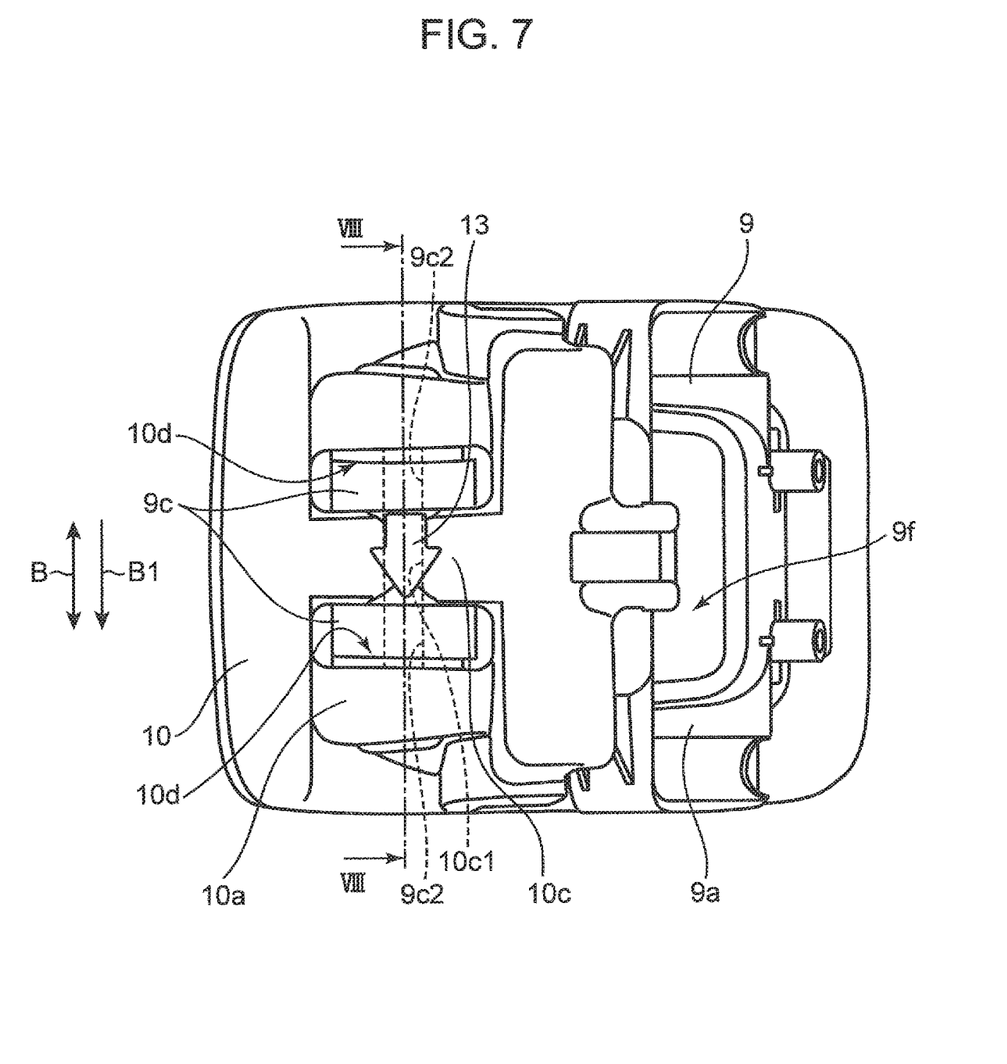
FIG. 7 is a view of the state where the bezel and the cover of FIG. 4 are connected to each other, as viewed from below.
Figure 8:
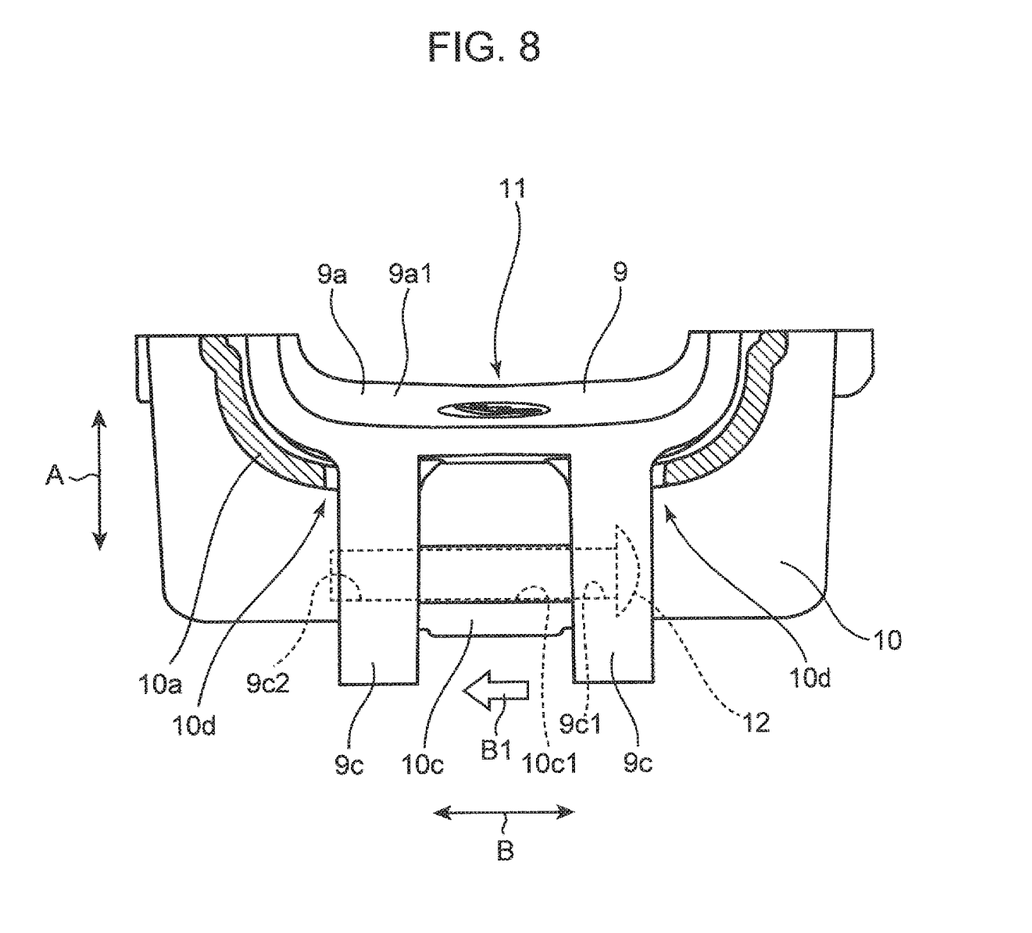
FIG. 8 is a sectional view taken along line VIII-VIII in FIG. 7.

As illustrated in FIGS. 7 and 8, in a state where the bezel-side protrusions 9c and the cover-side protrusion 10c overlap each other in the orthogonal direction B, the screw 12 is inserted into the through-hole 9c1 of one of the bezel-side protrusions 9e and the through-hole 10c1 of the cover-side protrusion 10c, and the male-threaded portion 12a is screwed into the female-threaded-hole 9c2 of the other of the bezel-side protrusions 9c to connect the bezel 9 and the cover 10 to each other.

Figure 4:
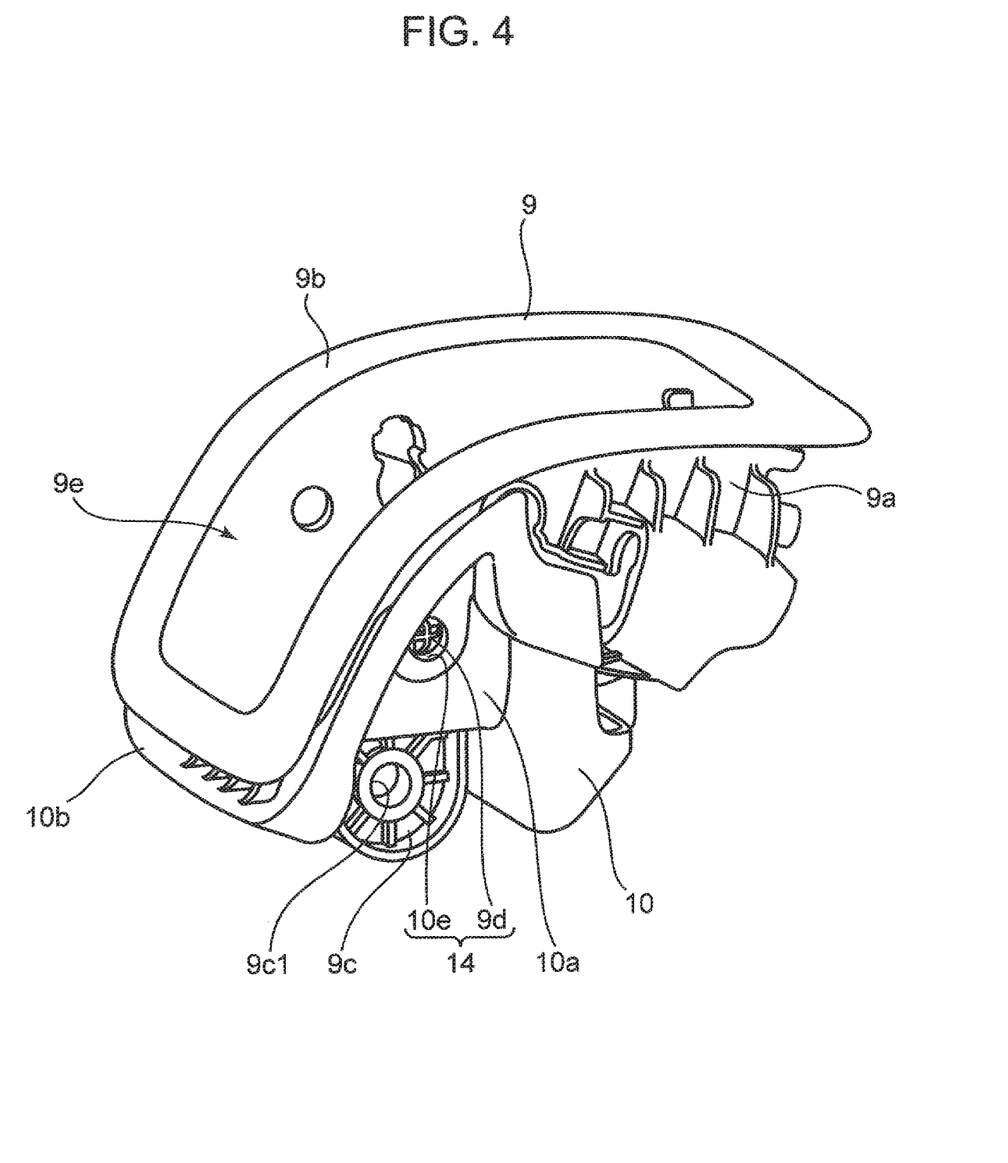
FIG. 4 is a perspective view illustrating a state where a bezel and a cover of FIG. 2 are connected to each other.

The seat 1 of the present embodiment further includes a holding mechanism 14, as illustrated in FIGS. 4 and 5, to facilitate alignment of the through-holes 9c1, 10c1 and the female-threaded-hole 9c2. The holding mechanism 14 has a structure capable of holding the cover 10 on the bezel 9 in a state where holes formed in the bezel-side protrusion 9c serving as the bezel-side overlap portion and in the cover-side protrusion 10c serving as the cover-side overlap portion, i.e., the through-hole 9c1 of one of the bezel-side protrusions 9c, the through-hole 10c1 of the cover-side protrusion 10c, and the female-threaded-holes 9c2 of the other of the bezel-side protrusions 9c, communicate with each other on a coaxial line.

Specifically, the holding mechanism 14 includes a pair of holding protrusions 9d that protrudes from respective outer peripheral surfaces of the side portions 9a2 on both sides of the bezel body 9a in the orthogonal direction B intersecting the attaching-and-detaching-direction A, and a pair of fitting holes 10e that is formed in the respective side portions 10a2 on both sides of the cover body 10a and that allows fitting of the corresponding pair of holding protrusions 9d.

The holding protrusion 9d is molded integrally with the bezel body 9a with resin.

The holding protrusion 9d includes a cut-off portion to prevent a sink mark of resin of the bezel body 9a at the time of molding the bezel body 9a. In the present embodiment, specifically, a recessed portion (cut-off portion) divided into four portions in a cross shape is provided.

In the present embodiment, at least one of the bezel-side protrusion 9c and the cover-side protrusion 10c (the cover-side protrusion 10c in the present embodiment) has an arrow mark 13 (direction indicating portion) indicating an insertion direction B1 in which the screw 12 is inserted into the female-threaded-hole 9c2 (see FIG. 7).

This enables an operator to easily perform screwing operation by inserting the screw 12, while visually checking the arrow mark 13, in correct insertion direction B1, i.e., in a direction of inserting the screw 12 into the through-hole 9c1 of one of the bezel-side protrusions 9c, the through-hole 10c1 of the cover-side protrusion 10c, and the female-threaded-hole 9c2 of the other of the bezel-side protrusions 9c, in this order.

The arrow mark 13 is molded integrally with the cover-side protrusion 10c with resin to position the through-hole 10c1 and the arrow mark 13 to overlap each other in a direction intersecting a direction in which the through-hole 10c1 extends, i.e., in a vertical direction in a paper-surface of FIG. 7, being the attaching-and-detaching-direction A of FIG. 8. In the present embodiment, the arrow mark 13 has a cut-off portion for preventing a sink mark of resin at the time of molding the cover-side protrusion 10c. The arrow mark 13 is high in thickness only in a rim of a shape of the arrow indicating the insertion direction B1 of the screw 12, and is low in thickness in other portions to form the cut-off portion. This enables preventing a sink mark of the resin at the time of molding the cover-side protrusion 10c.

The seat 1 configured as described above has a structure in which the bezel 9 and the cover 10 of the connector attaching part 4 are assembled to the metal bar 5 inside the pad opening 7a as follows.

First, the bezel 9 and the cover 10 before being connected to each other illustrated in FIGS. 5 and 6 are vertically inverted. That is, the bezel 9 is inverted such that the pair of bezel-side protrusions 9c faces upward, and further, the cover 10 is moved to a position above the bezel 9, and then the cover 10 is inverted such that the cover-side protrusion 10c faces upward (i.e., is inverted in a direction in which the arrow mark 13 faces upward).

Subsequently, the bezel body 9a of the bezel 9 is inserted from below into a covering material-side opening 3a (see FIG. 3) in a state where the covering material 8 is vertically inverted (a state where a back surface of the covering material 8 faces upward). Then, the peripheral portion 8b of the covering material 8 is sandwiched between the front-side contact portion 9b of the bezel 9 and the back-side contact portion 10b of the cover 10. At the same time, the pair of bezel-side protrusions 9c is inserted into the corresponding openings 10d of the bottom portion 10a1 of the cover 10, and the pair of bezel-side protrusions 9c is aligned with the cover-side protrusion 10c in the orthogonal direction B.

As described above, when the peripheral portion 8b of the covering material 8 is sandwiched from both the front and back sides by the front-side contact portion 9b of the bezel 9 and the back-side contact portion 10b of the cover 10, an operator can easily perform the screwing operation by inserting the screw 12 in a direction of inserting the screw 12 into the through-holes 9c1, 10c1 and the female-threaded-hole 9c2 in this order while visually checking the arrow mark 13 of the cover 10 from above.

The screwing operation is specifically performed as illustrated in FIGS. 7 and 8 such that in a state where the bezel-side protrusions 9c and the cover-side protrusion 10c overlap each other in the orthogonal direction B, the screw 12 is inserted into the through-hole 9c1 of one of the bezel-side protrusions 9c and the through-hole 10c1 of the cover-side protrusion 10c in this order in the insertion direction B1, and the male-threaded portion 12a is screwed into the female-threaded-hole 9c2 of the other of the bezel-side protrusions 9c to connect the bezel 9 and the cover 10 to each other.

After the bezel 9 and the cover 10 are connected to each other to integrate the covering material 8, the bezel 9, and the cover 10, the covering material 8, the bezel 9, and the cover 10 are vertically inverted. This causes the bezel 9 to move to a position above the covering material 8, and the cover 10 to move to a position below the covering material 8.

After that, the metal bar 5 is inserted into the slit 9f (see FIGS. 5 and 6) of the bezel body 9a of the bezel 9, and engagement portions 9g (see FIG. 5) provided outside the corresponding pair of side portions 9a2 are engaged with the respective arm portions on both sides of the metal bar 5. This causes the bezel 9 and the cover 10 to be fixed to the metal bar 5 to complete the assembly of the bezel 9 and the cover 10.

When the cover 10 has a structure similar to the slit 9f, the engagement portion 9g, and the like of the bezel 9, i.e., a structure capable of engaging with the metal bar 5 or the like, the cover 10 may be fixed to a metal frame like the metal bar 5 or the like after the bezel 9 and the cover 10 are connected to each other with the screw 12.

Features of the Present Embodiment (1)

The seat 1 of the present embodiment includes the bezel 9, the cover 10, and the screw 12 serving as a fastening member. The bezel 9 is disposed inside the covering material 8 and includes the bezel body 9a having a shape capable of receiving the connector 6 of the child safety seat, and the front-side contact portion 9b in contact with the peripheral portion 8b of the covering material opening 8a on the front side of the covering material 8. The cover 10 is configured to cover at least a part of the outer peripheral surface of the bezel body 9a, and includes the cover body 10a detachable from the bezel body 9a in the predetermined attaching-and-detaching-direction A, and the back-side contact portion 10b in contact with the peripheral portion 8b of the covering material opening 8a on the back side of the covering material 8.

The bezel 9 and the cover 10 respectively include the bezel-side protrusion 9c (bezel-side overlap portion) and the cover-side protrusion 10c (cover-side overlap portion) that overlap each other in the orthogonal direction B that is the predetermined intersecting direction intersecting the attaching-and-detaching-direction A of the bezel body 9a and the cover body 10a.

The cover-side protrusion 10c and one of the bezel-side protrusions 9c respectively include the through-holes 10c1 and 9c1 that are formed in the orthogonal direction B and that allow insertion of the screw 12.

The other of the bezel-side protrusions 9c includes the female-threaded-hole 9c2 that is formed in the orthogonal direction B to communicate with the through-holes 9c1 and 10c1 and that allows insertion of the screw 12 and fastening of the male-threaded portion 12a.

In the state where the bezel-side protrusions 9c and the cover-side protrusion 10c overlap each other in the orthogonal direction B, the screw 12 is inserted into the through-hole 9c1 of one of the bezel-side protrusions 9c, the through-hole 10c1 of the cover-side protrusion 10c, and the female-threaded-hole 9c2 of the other of the bezel-side protrusions 9c, and the male-threaded portion 12a is screwed into the female-threaded-hole 9c2 thereof to connect the bezel 9 and the cover 10 to each other.

Thus, even when an external force is applied to the bezel 9 in the attaching-and-detaching-direction A (e.g., when a seated occupant or the like rides the seat 1 to take baggage behind the seat 1, the covering material 8 around the bezel 9 is pushed down due to a weight of the seated occupant or the like), a risk of damage to the female-threaded-hole 9c2 formed in at least a part of the bezel 9 and the cover 10 is reduced. As a result, a risk of releasing the connection between the bezel 9 and the cover 10 is reduced.

(2)

Additionally, the bezel 9 and the cover 10 sandwich the peripheral portion 8b made of a thin resin of the covering material 8 from the front surface and the back surface of the covering material 8 to hold the covering material 8, preventing it from being displaced from the bezel 9. Thus, even when the covering material 8 receives an external force to be displaced from the bezel 9, a gap is hardly generated between the bezel 9 and the covering material 8. This enables not only preventing a problem that a user (especially an infant) pinches its finger in the gap, but also maintaining a beautiful appearance of the seat 1.

In other words, the cover 10 has a function to prevent a vertical gap from being generated between the bezel 9 and the covering material 8 when the covering material 8 sinks due to pressure from a seated occupant, thereby preventing a place other than a place where the bezel 9 is normally exposed (i.e., a place of the bezel 9 below the covering material 8 that is normally invisible) from being exposed. Specifically, the peripheral portion 8b of the covering material 8 is sandwiched between the front-side contact portion 9b of the bezel 9 and the back-side contact portion 10b of the cover 10, so that the whole of the bezel 9 and the cover 10 displace downward together with the covering material 8 when the covering material 8 sinks. This causes no vertical gap to be fouiied between the bezel 9 and the covering material 8, so that a place of the bezel 9 other than the place where it is normally exposed can be prevented from being exposed.

(3)

In the seat 1 of the present embodiment, the intersecting direction is a direction orthogonal to the attaching-and-detaching-direction A. That is, the screw 12 is disposed facing the orthogonal direction B orthogonal to the attaching-and-detaching-direction A. Thus, even when an external force is applied to the bezel 9 in the attaching-and-detaching-direction A, the external force acts on a fastening portion between the screw 12 and the female-threaded-hole 9c2 in a direction orthogonal thereto (i.e., in a direction in which the fastening portion is sheared). This further reduces a risk of damaging the female-threaded-hole 9c2. As a result, the risk of releasing the connection between the bezel 9 and the cover 10 is further reduced.

In the present invention, the screw 12 may not be disposed in the orthogonal direction B as long as it is disposed in a direction intersecting the attaching-and-detaching-direction A. When the screw 12 is disposed in the orthogonal direction B, it is preferable due to increase in effect of reducing the damage of the female-threaded-hole 9c2.

(4)

In the seat 1 of the present embodiment, at least the bezel 9 of the bezel 9 and the cover 10 is molded with resin as a member formed with the female-threaded-hole 9c2. However, the risk of damaging the female-threaded-hole 9c2 is reduced by the above-described structure, so that the risk of releasing even the connection between the bezel 9 made of resin and the cover 10 is also reduced.

Even when the female-threaded-hole is formed in the cover 10 and the cover is made of resin, a similar effect can be achieved.

(5)

In the seat 1 of the present embodiment, the bezel-side protrusion 9c protrudes from the outer peripheral surface of the bottom portion 9a1 of the bezel body 9a, and is integrally formed with the bezel body 9a with resin. The bezel body 9a has the inner peripheral surface including the surface that is visible from the outside and that is formed with the ISOFIX mark 11 as the display portion for displaying information with regard to a child safety seat. The bezel-side protrusion 9c is disposed at a position other than the back side of the ISOFIX mark 11 on the outer peripheral surface of the bottom portion 9a1 of the bezel body 9a. This reduces a risk that a portion formed with the ISOFIX mark 11 on the inner peripheral surface of the bezel body 9a dents due to influence of shrinkage of resin of the bezel-side protrusion 9c (i.e., a risk of generating a sink mark) when the bezel body 9a and the bezel-side protrusion 9c are integrally molded with the resin.

The display portion for displaying information with regard to a child safety seat may display information other than the ISOFIX mark 11.

(6)

In the seat 1 of the present embodiment, the pair of bezel-side protrusions 9c is disposed at respective positions separated from each other across a region on the outer peripheral surface of the bottom portion 9a1 of the bezel body 9a, the region being the back side of the ISOFIX mark 11. This enables reducing a risk that a portion formed with the ISOFIX mark 11 on the inner peripheral surface of the bezel body 9a dents due to influence of shrinkage of resin of the pair of bezel-side protrusions 9c (a risk of generating a sink mark) when the bezel body 9a and the pair of bezel-side protrusions 9c are integrally molded with the resin.

(7)

In the seat 1 of the present embodiment, the pair of bezel-side protrusions 9c is provided protruding from respective positions separated from each other on the outer peripheral surface of the bottom portion 9a1 of the bezel body 9a. The cover-side protrusion 10c is disposed between the pair of bezel-side protrusions 9c. The cover-side protrusion 10c is formed with the through-hole 10c1. One of the pair of bezel-side protrusions 9c is formed with the through-hole 9c1 allowing insertion of the screw 12. The other thereof is formed with the female-threaded-hole 9c2. In the state where the through-hole 10c1 of the cover-side protrusion 10c and the through-hole 9c1 and the female-threaded-hole 9c2 of the pair of bezel-side protrusions 9c communicate with each other, the screw 12 is inserted into the through-hole 9c1 of one of the bezel-side protrusions 9c, the through-hole 10c1 of the cover-side protrusion 10c, and the female-threaded-hole 9c2 of the other of the bezel-side protrusions 9c, and the male-threaded portion 12a of the screw 12 is screwed into the female-threaded-hole 9c2 thereof. This enables the bezel 9 and the cover 10 to be securely connected.

(8)

The seat 1 of the present embodiment further includes the holding mechanism 14 (specifically, the structure including the holding protrusions 9d and the fitting holes 10e) that holds the cover 10 on the bezel 9 in the state where holes formed in the pair of bezel-side protrusions 9c and the cover-side protrusion 10c, i.e., the through-hole 9c1 of one of the bezel-side protrusions 9c, the through-hole 10c1 of the cover-side protrusion 10c, and the female-threaded-holes 9c2 of the other of the bezel-side protrusions 9c, communicate with each other on a coaxial line. Thus, holding the cover 10 before being connected to the bezel 9 with the screw 12 using the holding mechanism 14 enables the through-hole 9c1 of the one of the bezel-side protrusions 9c, the through-hole 10c1 of the cover-side protrusion 10c, and the female-threaded-holes 9c2 of the other of the bezel-side protrusions 9c to communicate with each other on the coaxial line. In this state, the screw 12 is inserted into the through-holes 9c1, 10c1 and the female-threaded-hole 9c2, and the male-threaded portion 12a is fastened to the female-threaded-hole 9c2. This enables facilitating connecting operation between the bezel 9 and the cover 10.

(9)

In the seat 1 of the present embodiment, the holding mechanism 14 includes the holding protrusions 9d that protrude from respective outer peripheral surfaces of the side portions 9a2 of the bezel body 9a in the orthogonal direction B intersecting the attaching-and-detaching-direction A, and the fitting holes 10e that are limited in the respective side portions 10a2 of the cover body 10a and that allow fitting of the corresponding holding protrusions 9d. Thus, fitting the holding protrusions 9d of the bezel body 9a into the corresponding fitting holes 10e of the cover body 10a enables the cover 10 before being connected with the screw 12 to be easily and reliably held on the bezel 9.

The placement of the holding protrusions 9d and the fitting holes 10e, constituting the holding mechanism 14, may be reversed. That is, the fitting holes may be provided in the bezel body 9a, and the holding protrusions may be provided on the cover body 10a.

The holding mechanism 14 may have a structure other than the holding protrusion and the fitting hole, as long as the cover 10 can be held on the bezel 9 allowing the through-hole and the female-threaded-hole to communicate with each other on a coaxial line. For example, the holding mechanism may be a combination of a ridge and a groove.

(10)

In the seat 1 of the present embodiment, the bezel body 9a and the holding protrusion 9d are integrally molded with resin. The holding protrusion 9d includes a cut-off portion such as a recessed portion to prevent a sink mark of resin of the bezel body 9a at the time of molding the bezel body 9a, for example, four recessed portions divided in a cross shape. This enables preventing a sink mark of the resin of the bezel body 9a at the time of molding the bezel body 9a.

The holding protrusion 9d is not limited to the cross shape, as long as it has a cut-off portion such as a recessed portion for preventing a sink mark of the resin of the bezel body 9a. For example, even in a columnar holding protrusion provided its leading end surface with one or more slits, or a cylindrical holding protrusion with a central portion hollowed out, a sink mark of the resin of the bezel body 9a can be prevented.

(11)

In the seat 1 of the present embodiment, at least one of the bezel-side protrusion 9c and the cover-side protrusion 10c (the cover-side protrusion 10c in the present embodiment) has the arrow mark 13 indicating a direction of inserting the screw 12 into the female-threaded-hole 9c2. Thus, an operator can easily find the insertion direction B1 of the screw 12 into the female-threaded-hole 9c2 by visually checking the arrow mark 13 provided on the cover 10. This enables improving workability in connecting operation between the bezel 9 and the cover 10 with the screw 12.

(12)

In the seat 1 of the present embodiment, the cover-side protrusion 10c is integrally molded with the arrow mark 13 with resin so that the through-hole 10c1 and the arrow mark 13 are positioned overlapping each other. The arrow mark 13 includes a cut-off portion to prevent a sink mark of resin of the bezel body 9a at the time of molding the bezel body 9a. For example, only a rim of a shape of the arrow indicating the direction is increased in thickness, and other portions are low in thickness to form the cut-off portion. This enables preventing a sink mark of the resin of the cover 10 at the time of molding the cover 10.

The above-described operation effect can also be achieved when the arrow mark 13 is integrally molded with the bezel-side protrusion 9c with resin.

(Modification)

(A)

While in the seat 1 of the above embodiment, one of the bezel-side protrusions 9c and the cover-side protrusion 10c respectively include the through-holes 9c1 and 10c1 that are formed in the orthogonal direction B and that allow insertion of the screw 12, and the other of the bezel-side protrusions 9c includes the female-threaded-hole 9c2 that is formed in the orthogonal direction B communicating with the through-holes 9c1 and 10c1 and that allows fastening of the male-threaded portion 12a, the present invention is not limited to this.

In the present invention, the bezel-side protrusion 9c as the bezel-side overlap portion and the cover-side protrusion 10c as the cover-side overlap portion each include a hole that is formed in the intersecting direction and that allows insertion of the screw 12, and at least one hole of the bezel-side protrusion 9c and the cover-side protrusion 10c may be a female-threaded-hole that allows fastening of the male-threaded portion 12a. Thus, female-threaded-holes may be formed in all of the bezel-side protrusion 9c and the cover-side protrusion 10c.

(B)

While in the seat 1 of the above embodiment, one of the bezel-side protrusions 9c and the cover-side protrusion 10c respectively include the through-holes 9c1 and 10c1 that are formed in the orthogonal direction B and that allow insertion of the screw 12, and the other of the bezel-side protrusions 9c includes the female-threaded-hole 9c2 that is formed in the orthogonal direction B communicating with the through-holes 9c1 and 10c1 and that allows fastening of the male-threaded portion 12a, the present invention is not limited to this.

For example, a pair of cover-side protrusions 10c may be provided with a through-hole and a female-threaded-hole, respectively, while only one bezel-side protrusion 9c is provided with only a through-hole. Alternatively, the bezel-side protrusion 9c and the cover-side protrusion 10c may be provided one by one, and one of them may be formed with a through-hole and the other thereof may be formed with a female-threaded-hole.

(C)

While in the seat 1 of the above embodiment, the bezel-side protrusion 9c protruding from the bezel body 9a and the cover-side protrusion 10c projecting from the cover body 10a are respectively exemplified as the bezel-side overlap portion and the cover-side overlap portion of the present invention, the present invention is not limited to this. Any portions overlapping each other in a direction intersecting the attaching-and-detaching-direction A of the bezel body 9a and the cover body 10a may each serve as the corresponding one of the bezel-side overlap portion and the cover-side overlap portion of the present invention. Thus, the side portion 9a2 of the bezel body 9a and the side portion 10a2 of the cover body 10a also may serve as the bezel-side overlap portion and the cover-side overlap portion, respectively. That is, the side portion 9a2 of the bezel body 9a and the side portion 10a2 of the cover body 10a may be formed with a through-hole and a female-threaded-hole, respectively, as holes allowing insertion of the screw 12.

The seat described in association with the above embodiment mainly has the following features.

The seat of the above embodiment allows attaching of a child safety seat, and includes: a covering material formed with a covering material opening allowing insertion of a connector of the child safety seat; a bezel including a bezel body that is disposed inside the covering material, and that has a shape capable of receiving the connector, and a front-side contact portion in contact with a peripheral portion of the covering material opening on a front side of the covering material; a cover including a cover body covering at least a part of an outer peripheral surface of the bezel body, the cover body being detachable from the bezel body in a predetermined attaching-and-detaching-direction, and a back-side contact portion in contact with a peripheral portion of the covering material opening on a back side of the covering material; and a fastening member with a male-threaded portion. The bezel and the cover include a bezel-side overlap portion and a cover-side overlap portion, respectively, overlapping each other in a predetermined intersecting direction intersecting the predetermined attaching-and-detaching-direction of the bezel body and the cover body. The bezel-side overlap portion and the cover-side overlap portion are each formed with a hole allowing insertion of the fastening member in the predetermined intersecting direction. The hole of at least one of the bezel-side overlap portion and the cover-side overlap portion is a female-threaded-hole allowing fastening of the male-threaded portion. The fastening member is inserted into the hole and the male-threaded portion is screwed into the female-threaded-hole to connect the bezel and the cover to each other with the bezel-side overlap portion and the cover-side overlap portion overlapping each other in the intersecting direction.

In such a structure, the bezel and the cover respectively include the bezel-side overlap portion and the cover-side overlap portion that overlap with each other in the predetermined intersecting direction intersecting the attaching-and-detaching-direction of the bezel body and the cover body. The bezel-side overlap portion and the cover-side overlap portion are formed with respective holes allowing insertion of the fastening member in the predetermined intersecting direction, and at least one of the holes is a female-threaded-hole. Then, in a state where the bezel-side overlap portion and the cover-side overlap portion overlap each other in the intersecting direction, the fastening member is inserted into the hole extending in the intersecting direction and the male-threaded portion is screwed into the female-threaded-hole to connect the bezel and the cover to each other. Thus, even when an external force is applied to the bezel in the attaching-and-detaching-direction (e.g., when a seated occupant or the like rides the seat and steps on the bezel), a risk of damage to the female-threaded-hole formed in at least a part of the bezel and the cover is reduced. As a result, a risk of releasing the connection between the bezel and the cover is reduced.

The seat described above is preferably configured such that the intersecting direction is orthogonal to the attaching-and-detaching-direction.

In such a structure, even when an external force is applied to the bezel in the attaching-and-detaching-direction, the external force acts on a fastening portion between the fastening member and the female-threaded-hole in a direction orthogonal thereto (i.e., in a direction in which the fastening portion is sheared). This further reduces a risk of damaging the female-threaded-hole. As a result, the risk of releasing the connection between the bezel and the cover is further reduced.

The seat described above is preferably configured such that at least one of the bezel and the cover, being formed with the female-threaded-hole, is molded with resin.

In such a structure, even when at least one of the bezel and the cover, being formed with the female-threaded-hole, is molded with resin, a risk of damaging the female-threaded-hole is reduced. This reduces a risk of releasing a connection between the bezel even made of resin and the cover.

The seat described above is preferably configured as follows: the bezel-side overlap portion projects from the outer peripheral surface of the bezel body; the bezel body and the bezel-side overlap portion are integrally molded with resin; the bezel body has an inner peripheral surface including a surface that is visible from an outside and that is formed with a display portion for displaying information with regard to the child safety seat; and the bezel-side overlap portion is disposed at a position other than a back side of the display portion on the outer peripheral surface of the bezel body.

In such a structure, the bezel-side overlap portion is disposed at the position other than the back side of the display portion on the outer peripheral surface of the bezel body. This reduces a risk that a portion formed with the display portion on the inner peripheral surface of the bezel body dents due to influence of shrinkage of resin of the bezel-side overlap portion (i.e., a risk of generating a sink mark) when the bezel body and the bezel-side overlap portion are integrally molded with the resin.

The seat described above is preferably configured such that the bezel includes a pair of the bezel-side overlap portions disposed at respective positions separated from each other across a region on the outer peripheral surface of the bezel body on the back side of the display portion.

In such a structure, even when a pair of bezel-side overlap portions is provided, the pair of the bezel-side overlap portions is disposed at respective positions separated from each other across a region on the outer peripheral surface of the bezel body on the back side of the display portion. This enables reducing a risk that a portion formed with the display portion on the inner peripheral surface of the bezel body dents due to influence of shrinkage of resin of the pair of bezel-side overlap portions (i.e., a risk of generating a sink mark) when the bezel body and the bezel-side overlap portions are integrally molded with the resin.

The seat described above is preferably configured as follows: the bezel includes a pair of the bezel-side overlap portions provided protruding from respective positions separated from each other on the outer peripheral surface of the bezel body; the cover-side overlap portion is disposed between the pair of the bezel-side overlap portions; the fastening member is inserted into each of the holes of the cover-side overlap portion and the bezel-side overlap portions; and the male-threaded portion of the fastening member is screwed into the female-threaded-hole to connect the bezel and the cover to each other.

In such a structure, to connect the bezel and the cover to each other, the cover-side overlap portion is disposed between the pair of bezel-side overlap portions, and the fastening member is inserted into respective holes of the cover-side overlap portion and the bezel-side overlap portions with the through-hole of the cover-side overlap portion communicating with the holes of the pair of bezel-side overlap portions, and then the male-threaded portion of the fastening member is screwed into the female-threaded-hole. This enables the bezel and the cover to be reliably connected to each other.

The seat described above is preferably configured to further include a holding mechanism that holds the cover on the bezel in a state where the holes formed in the bezel-side overlap portion and the cover-side overlap portion communicate with each other on a coaxial line.

In such a structure, holding the cover before being connected to the bezel with the fastening member using the holding mechanism enables the holes formed in the bezel-side overlap portion and the cover-side overlap portion to communicate with each other on a coaxial line. Inserting the fastening member into the holes and fastening the male-threaded portion into the female-threaded-hole in this state enable facilitating connecting operation between the bezel and the cover.

The seat described above is preferably configured such that the holding mechanism includes a holding protrusion protruding from the outer peripheral surface of the bezel body in a direction intersecting the attaching-and-detaching-direction, and a fitting hole allowing fitting of the holding protrusion formed on the cover body.

In such a structure, fitting the holding protrusion of the bezel body into the fitting hole of the cover body enables the cover before being connected with the fastening member to be easily and reliably held on the bezel.

The seat described above is preferably configured such that the bezel body and the holding protrusion are integrally molded with resin, and the holding protrusion includes a cut-off portion.

In such a structure, the bezel body and the holding protrusion are integrally molded with resin. The holding protrusion has the cut-off portion, i.e., a portion that is not partially filled with resin such as a recessed portion, for example, four recessed portions divided in a cross shape. This enables preventing a sink mark of resin of the bezel body at the time of molding the bezel body.

The seat described above is preferably configured such that at least one of the bezel-side overlap portion and the cover-side overlap portion includes a direction indicating portion indicating a direction of inserting the fastening member into the female-threaded-hole.

In such a structure, an operator can easily find a direction of inserting the fastening member into the female-threaded-hole by visually checking the direction indicating portion provided on the cover. This enables improving workability in connecting operation between the bezel and the cover with the fastening member.

The seat described above is preferably configured such that at least one of the bezel-side overlap portion and the cover-side overlap portion, including the direction indicating portion, is integrally molded with the direction indicating portion with resin to position the hole and the direction indicating portion to overlap each other in a direction intersecting a direction in which the hole extends, and the direction indicating portion includes a cut-off portion.

In such a structure, at least one of the bezel-side overlap portion and the cover-side overlap portion, including the direction indicating portion, is integrally molded with the direction indicating portion with resin to position the hole and the direction indicating portion to overlap each other in a direction intersecting a direction in which the hole extends. The direction indicating portion includes the cut-off portion. For example, only a rim of a shape of the arrow indicating the direction is increased in thickness, and other portions are low in thickness to form the cut-off portion. This cut-off portion enables preventing a sink mark of resin at the time of molding the bezel overlap portion or the cover-side overlap portion.

The seat of the above embodiment enables reducing a risk of releasing a connection between the bezel and the cover.

This application is based on Japanese Patent application No. 2019-111392 filed in Japan Patent Office on Jun. 14, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A seat allowing attaching of a child safety seat, the seat comprising:
   a covering material formed with a covering material opening allowing insertion of a connector of the child safety seat;
   a bezel including a bezel body that is disposed inside the covering material, and that has a shape capable of receiving the connector, and a front-side contact portion in contact with a peripheral portion of the covering material opening on a front side of the covering material; and
   a cover including a cover body covering at least a part of an outer peripheral surface of the bezel body, the cover body being detachable from the bezel body in a predetermined attaching-and-detaching-direction, and a back-side contact portion in contact with a peripheral portion of the covering material opening on a back side of the covering material; and
   a fastening member with a male-threaded portion, wherein
   the bezel and the cover include a bezel-side overlap portion and a cover-side overlap portion, respectively, overlapping each other in a predetermined intersecting direction intersecting the predetermined attaching-and-detaching-direction of the bezel body and the cover body,
   the bezel-side overlap portion and the cover-side overlap portion are each formed with a hole allowing insertion of the fastening member in the predetermined intersecting direction,
   the hole of at least one of the bezel-side overlap portion and the cover-side overlap portion is a female-threaded-hole allowing fastening of the male-threaded portion, and
   the fastening member is inserted into the hole and the male-threaded portion is screwed into the female-threaded-hole to connect the bezel and the cover to each other with the bezel-side overlap portion and the cover-side overlap portion overlapping each other in the intersecting direction.

2. The seat according to claim 1, wherein
the intersecting direction is orthogonal to the attaching-and-detaching-direction.

3. The seat according to claim 1, wherein
at least one of the bezel and the cover, the at least one being formed with the female-threaded-hole, is molded with resin.

4. The seat according to claim 1, wherein
the bezel-side overlap portion projects from the outer peripheral surface of the bezel body,
the bezel body and the bezel-side overlap portion are integrally molded with resin,
the bezel body has an inner peripheral surface including a surface that is visible from an outside and that is formed with a display portion for displaying information with regard to the child safety seat, and
the bezel-side overlap portion is disposed at a position other than a back side of the display portion on the outer peripheral surface of the bezel body.

5. The seat according to claim 4, wherein
the bezel includes a pair of the bezel-side overlap portions disposed at respective positions separated from each other across a region on the outer peripheral surface of the bezel body, the region being on the back side of the display portion.

6. The seat according to claim 1, wherein
the bezel includes a pair of the bezel-side overlap portions provided protruding from respective positions separated from each other on the outer peripheral surface of the bezel body,
the cover-side overlap portion is disposed between the pair of the bezel-side overlap portions,
the fastening member is inserted into each of the holes of the cover-side overlap portion and the bezel-side overlap portions, and
the male-threaded portion of the fastening member is screwed into the female-threaded-hole to connect the bezel and the cover to each other.

7. The seat according to claim 1, further comprising:
a holding mechanism that holds the cover on the bezel in a state where the holes formed in the bezel-side overlap portion and the cover-side overlap portion communicate with each other on a coaxial line.

8. The seat according to claim 7, wherein
the holding mechanism includes a holding protrusion protruding from the outer peripheral surface of the bezel body in a direction intersecting the attaching-and-detaching-direction, and a fitting hole allowing fitting of the holding protrusion formed on the cover body.

9. The seat according to claim 8, wherein
the bezel body and the holding protrusion are integrally molded with resin, and
the holding protrusion includes a cut-off portion.

10. The seat according to claim 1, wherein
at least one of the bezel-side overlap portion and the cover-side overlap portion includes a direction indicating portion indicating a direction of inserting the fastening member into the female-threaded-hole.

11. The seat according to claim 10, wherein
at least one of the bezel-side overlap portion and the cover-side overlap portion, the at least one including the direction indicating portion, is integrally molded with the direction indicating portion with resin to position the hole and the direction indicating portion to overlap each other in a direction intersecting a direction in which the hole extends, and
the direction indicating portion includes a cut-off portion.

* * * * *